US012075523B2

(12) United States Patent
Ng et al.

(10) Patent No.: US 12,075,523 B2
(45) Date of Patent: Aug. 27, 2024

(54) DEGRADATION SIGNALING (71) Applicant: Nokia Technologies Oy, Espoo (FI)

(72) Inventors: Man Hung Ng, Swindon (GB); Petri Vasenkari, Turku (FI); Toni Lähteensuo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 369 days.

(21) Appl. No.: 17/439,345

(22) PCT Filed: Mar. 6, 2020

(86) PCT No.: PCT/FI2020/050143
§ 371 (c)(1),
(2) Date: Sep. 14, 2021

(87) PCT Pub. No.: WO2020/201617
PCT Pub. Date: Oct. 8, 2020

(65) Prior Publication Data
US 2022/0225080 A1     Jul. 14, 2022

Related U.S. Application Data

(60) Provisional application No. 62/826,098, filed on Mar. 29, 2019.

(51) Int. Cl.
*H04W 24/02* (2009.01)
*H04L 5/00* (2006.01)
(Continued)

(52) U.S. Cl.
CPC ............... *H04W 8/24* (2013.01); *H04L 5/001* (2013.01); *H04L 5/0058* (2013.01); *H04W 76/11* (2018.02)

(58) Field of Classification Search
None
See application file for complete search history.

(56) References Cited

U.S. PATENT DOCUMENTS 10,660,098 B2 *   5/2020   Lim ................... H04L 5/001
2018/0049202 A1 * 2/2018   Lim ................... H04L 5/001
(Continued)

FOREIGN PATENT DOCUMENTS

CN      108141332 A    6/2018
CN      108476086 A    8/2018
(Continued)

OTHER PUBLICATIONS

"Close proximity MSD for FDD-TDD and TDD-TDD EN-DC", 3GPP TSG-RAN WG4 #90, R4-1901880, Agenda: 6.7.2.2, Qualcomm Incorporated, Feb. 25-Mar. 1, 2019, pp. 1-5.
(Continued)

*Primary Examiner* — Ajit Patel
(74) *Attorney, Agent, or Firm* — Harrington & Smith (57) ABSTRACT

A method and apparatus for signaling a message regarding UE receiver performance degradation between a user equipment and a network. Close UL/DL frequencies or harmonic relationships may cause MSD. A user equipment may indicate an actual or improved maximum sensitivity degradation value for a configuration, or that there is no maximum sensitivity degradation for a configuration, using capability transfer signaling, RRC reconfiguration signaling, and/or measurement reporting. The indicated maximum sensitivity degradation for a configuration may be found in a table. The user equipment may additionally signal information about configuration(s) it supports and/or measurements it has made related to cross band transmit-to-receive degradation and/or SINR. A UE may implicitly indicate a MSD value through selection of a bandwidth combination set. MSD may be used by the network to assist in making scheduling decisions.

18 Claims, 8 Drawing Sheets

(51) Int. Cl.
*H04W 8/24* (2009.01)
*H04W 36/20* (2009.01)
*H04W 76/11* (2018.01)

(56) References Cited

U.S. PATENT DOCUMENTS

| | | | |
|---|---|---|---|
| 2018/0206113 | A1 | 7/2018 | He et al. |
| 2018/0278283 | A1 | 9/2018 | Lim et al. |
| 2019/0081657 | A1 | 3/2019 | Zeng et al. |
| 2020/0045720 | A1* | 2/2020 | Abdel Shahid ... H04W 72/1268 |
| 2020/0359398 | A1* | 11/2020 | Takahashi ............... H04W 8/22 |

FOREIGN PATENT DOCUMENTS

| | | | |
|---|---|---|---|
| EP | 3 310 120 A1 | 4/2018 | |
| WO | WO-2019050215 A | 3/2019 | |
| WO | WO-2019214812 A1 * | 11/2019 | ........... H04B 7/0608 |

OTHER PUBLICATIONS

"3rd Generation Partnership Project; Technical Specification Group Radio Access Network; NR; User Equipment (UE) radio transmission and reception; Part 3: Range 1 and Range 2 Interworking operation with other radios (Release 15)", 3GPP TS 38.101-3, V15.4.0, Dec. 2018, pp. 1-216.

"3rd Generation Partnership Project; Technical Specification Group Radio Access Network; Evolved Universal Terrestrial Radio Access (E-UTRA); User Equipment (UE) radio transmission and reception (Release 16)", 3GPP TS 36.101, V16.0.0, Dec. 2018, pp. 1-1821.

"MSD for B25 + n41", 3GPP TSG-RAN WG4 Meeting #90, R4-1902146, Agenda: 6.7.2.2, Sprint, Feb. 25-Mar. 1, 2019, 2 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.4.0, Dec. 2018, pp. 1-933.

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.

"3rd Generation Partnership Project; Technical Specification Group Radio Access Network; NR; User Equipment (UE) radio transmission and reception; Part 1: Range 1 Standalone (Release 15)", 3GPP TS 38.101-1, V15.4.0, Dec. 2018, pp. 1-230.

"3rd Generation Partnership Project; Technical Specification Group Radio Access Network; NR; User Equipment (UE) radio transmission and reception; Part 2: Range 2 Standalone (Release 15)", 3GPP TS 38.101-2, V15.4.0, Dec. 2018, pp. 1-131.

International Search Report and Written Opinion received for corresponding Patent Cooperation Treaty Application No. PCT/FI2020/050143, dated Jun. 5, 2020, 15 pages.

"TP for TR 37.863-01-01 MSD for 2DL/2UL DC combinations including Band n77, n78 and n79", 3GPP TSG-RAN WG4 Meeting #84bis, R4-1711837, Agenda: 9.4.4.2.1, NTT DoCoMo, Inc, Oct. 9-13, 2017, 50 pages.

Extended European Search Report received for corresponding European Patent Application No. 20784569.4, dated Nov. 8, 2022, 15 pages.

"UE capability on PA architecture", 3GPP TSG-RAN WG2 Meeting #104, R2-1818976, Apple Inc, Nov. 12-16, 2018, 5 pages.

Office action received for corresponding Indian Patent Application No. 202147048912, dated Apr. 7, 2022, 6 pages.

* cited by examiner

FIG. 1

UE capability transfer

Fig. 2

RRC reconfiguration, successful

Fig. 3

RRC reconfiguration, failure

Fig. 4

Measurement reporting

Fig. 5

| Fig. 6A | Fig. 6B |
|---|---|

Table 7.3.1A-0f: 2DL/2UL interband Reference sensitivity QPSK $P_{REFSENS}$ and uplink/downlink configurations

| EUTRA CA Configuration | EUTRA band | UL F$_c$ (MHz) | UL/DL BW (MHz) | UL C$_{LRB}$ | DL F$_c$ (MHz) | MSD (dB) | Duplex mode | Source of IMD |
|---|---|---|---|---|---|---|---|---|
| CA_1A-3A | 1 | 1950 | 5 | 25 | 2140 | 23 | FDD | IMD3 |
|  | 3 | 1760 | 5 | 25 | 1855 | N/A |  | N/A |
| CA_1A-8A | 1 | 1965 | 5 | 25 | 2155 | 6 | FDD | IMD4 |
|  | 8 | 887.5 | 5 | 25 | 932.5 | N/A |  | N/A |
| CA_2A-4A | 2 | 1860 | 20 | 50[2] | 1940 | 5 | FDD | IMD3 |
|  | 4 | 1752.5 | 5 | 25 | 2152.5 | N/A |  | N/A |
| CA_2A-4A | 2 | 1868.3 | 5 | 25 | 1948.3 | N/A | FDD | N/A |
|  | 4 | 1735 | 5 | 25 | 2135 | 5 |  | IMD5 |
| CA_2A-46A | 2 | 1880 | 5 | 25 | 1960 | 12.0 | FDD | IMD3[4] |
|  | 46 | 5720 | 20 | 100 | 5720 | N/A |  | N/A |
| CA_2A-49A | 2 | 1852.5 | 5 | 25 | 1932.5 | [12] | FDD | IMD4 |
|  | 49 | 3625 | 20 | 100 | 3625 | N/A | TDD | N/A |
| CA_2A-66A | 2 | 1855 | 5 | 25 | 1935 | 20 | FDD | IMD3 |
|  | 66 | 1775 | 5 | 25 | 2175 | N/A |  | N/A |
| CA_2A-66A | 2 | 1883.3 | 5 | 25 | 1963.3 | N/A | FDD | N/A |
|  | 66 | 1750 | 5 | 25 | 2150 | 4 |  | IMD5 |
| CA_3A-5A | 3 | 1771 | 10 | 50 | 1866 | 4 | FDD | IMD4 |
|  | 5 | 838 | 5 | 25 | 883 | N/A |  | N/A |
| CA_3A-5A | 3 | 1721 | 10 | 50 | 1816 | N/A | FDD | N/A |
|  | 5 | 838 | 5 | 25 | 883 | 24 |  | IMD2[4] |
| CA_3A-7A | 3 | 1730 | 5 | 25 | 1825 | N/A | FDD | N/A |
|  | 7 | 2535 | 10 | 50 | 2655 | 13 |  | IMD4 |
| CA_3A-8A | 3 | 1755 | 10 | 50 | 1850 | N/A | FDD | N/A |
|  | 8 | 900 | 5 | 25 | 945 | 8 |  | IMD4[4] |
| CA_3A-8A | 3 | 1747.5 | 10 | 50 | 1842.5 | 6.4 | FDD | IMD5 |
|  | 8 | 897.5 | 5 | 25 | 942.5 | N/A |  | N/A |
| CA_3A-18A | 3 | 1721 | 5 | 25 | 1816 | 4 | FDD | IMD4 |
|  | 18 | 823 | 5 | 25 | 868 | N/A |  | N/A |
| CA_3A-19A | 3 | 1771 | 5 | 25 | 1866 | 4 | FDD | IMD4 |
|  | 19 | 838 | 5 | 25 | 883 | N/A |  | N/A |
| CA_3A-19A | 3 | 1721 | 5 | 25 | 1816 | N/A | FDD | N/A |
|  | 19 | 838 | 5 | 25 | 883 | 27 |  | IMD2[4] |
| CA_3A-20A | 3 | 1775 | 5 | 25 | 1870 | 4 | FDD | IMD4 |
|  | 20 | 840 | 5 | 25 | 799 | N/A |  | N/A |
| CA_3A-20A | 3 | 1735 | 5 | 25 | 1830 | N/A | FDD | N/A |
|  | 20 | 847 | 5 | 25 | 806 | 9 |  | IMD4 |
| CA_3A-26A | 3 | 1771 | 5 | 25 | 1866 | 4 | FDD | IMD4 |
|  | 26 | 838 | 5 | 25 | 883 | N/A |  | N/A |

Fig. 6A

| | | | | | | | | |
|---|---|---|---|---|---|---|---|---|
| CA_3A-26A | 3 | 1721 | 5 | 25 | 1816 | N/A | FDD | N/A |
| | 26 | 838 | 5 | 25 | 883 | 26 | | IMD2[4] |
| CA_3A-41A | 3 | 1740 | 5 | 25 | 1835 | 8.2 | FDD | IMD4 |
| | 41 | 2657.5 | 5 | 25 | 2657.5 | N/A | TDD | N/A |
| CA_3A-42A | 3 | 1740 | 5 | 25 | 1835 | 29.8 | FDD | IMD2[4] |
| | 42 | 3575 | 5 | 25 | 3575 | N/A | TDD | N/A |
| CA_3A-42A | 3 | 1765 | 5 | 25 | 1860 | 8.0 | FDD | IMD4[4] |
| | 42 | 3435 | 5 | 25 | 3435 | N/A | TDD | N/A |
| CA_4A-5A | 4 | 1721 | 5 | 25 | 2121 | N/A | FDD | N/A |
| | 5 | 838 | 5 | 25 | 883 | 26 | | IMD2[4] |
| CA_4A-7A | 4 | 1730 | 5 | 25 | 2130 | N/A | FDD | N/A |
| | 7 | 2535 | 5 | 25 | 2655 | 15 | | IMD4 |
| CA_5A-7A | 5 | 834 | 5 | 25 | 879 | 12 | FDD | IMD3[4] |
| | 7 | 2547 | 10 | 50 | 2667 | N/A | | N/A |
| CA_5A-66A | 5 | 838 | 5 | 25 | 883 | 30 | FDD | IMD2[4] |
| | 66 | 1721 | 5 | 25 | 2121 | N/A | | N/A |
| CA_7A-20A | 7 | 2512 | 10 | 50 | 2632 | N/A | FDD | N/A |
| | 20 | 851 | 5 | 25 | 810 | 12 | | IMD3[4] |
| CA_7A-26A | 7 | 2556 | 5 | 25 | 2676 | N/A | FDD-FDD | N/A |
| | 26 | 837 | 5 | 25 | 882 | 16.0 | | IMD3 |
| | 7 | 2567.5 | 5 | 25 | 2687.5 | 2.5 | FDD-FDD | IMD5 |
| | 26 | 816.5 | 5 | 25 | 861.5 | N/A | | N/A |
| CA_8A-41A | 8 | 882.5 | 5 | 25 | 927.5 | 12.1 | FDD | IMD3[4] |
| | 41 | 2685 | 10 | 50 | 2685 | N/A | TDD | N/A |
| CA_19A-42A[3] | 19 | N/A | N/A | N/A | N/A | N/A | FDD | N/A |
| | 42 | N/A | N/A | N/A | N/A | N/A | TDD | N/A |
| CA_21A-28A | 21 | 1450.4 | 5 | 25 | 1498.4 | [2.5] | FDD | IMD5 |
| | 28 | 735.5 | 5 | 25 | 790.5 | N/A | TDD | N/A |
| CA_21A-42A[3] | 21 | N/A | N/A | N/A | N/A | N/A | FDD | N/A |
| | 42 | N/A | N/A | N/A | N/A | N/A | TDD | N/A |
| CA_28A-42A | 28 | 705.5 | 5 | 25 | 760.5 | [5.5] | FDD | IMD5 |
| | 42 | 3582.5 | 5 | 25 | 3582.5 | N/A | TDD | N/A |
| CA_40A-42A | 40 | 2350 | 5 | 25 | 2350 | N/A | TDD | N/A |
| | 42 | 3500 | 5 | 25 | 3550 | 5 | | IMD4 |
| | 40 | 2350 | 5 | 25 | 2350 | 5 | TDD | IMD4 |
| | 42 | 3525 | 5 | 25 | 3525 | N/A | | N/A |

NOTE 1: Both of the transmitters shall be set min(+20 dBm, $P_{CMAX\_L,c}$) as defined in subclause 6.2.5A
NOTE 2: $RB_{START} = 0$
NOTE 3: No requirements apply when there is at least one individual RE within the intermodulation generated by the dual uplink is within the downlink transmission bandwidth of the FDD band. The reference sensitivity should only be verified when this is not the case (the requirements specified in clause 7.3.1 apply).
NOTE 4: This band is subject to IMD5 also which MSD is not specified.
NOTE 5: Void
NOTE 6: For operations with 4 antenna ports, the MSD in the applicable bands shall be modified by the absolute value of $\Delta R_{IB,4R}$ in Table 7.3.1-1a when MSD > 0.

Fig. 6B

Table 7.3A.4-1: Reference sensitivity exceptions due to UL harmonic for NR CA FR1

| UL band | DL band | \multicolumn{12}{c}{MSD due to harmonic exception for the DL band} |
|---|---|---|---|---|---|---|---|---|---|---|---|---|---|

| UL band | DL band | 5 MHz dB | 10 MHz dB | 15 MHz dB | 20 MHz dB | 25 MHz dB | 30 MHz dB | 40 MHz dB | 50 MHz dB | 60 MHz dB | 80 MHz dB | 90 MHz dB | 100 MHz dB |
|---|---|---|---|---|---|---|---|---|---|---|---|---|---|
| n3 | n77[1,2] |  | 23.9 | 22.1 | 20.9 |  |  | 17.9 | 16.9 | 16.1 | 14.8 | 14.3 | 13.8 |
|  | n77[3] |  | 1.1 | 0.8 | 0.3 |  |  | 0 | 0 | 0 | 0 | 0 | 0 |
| n3 | n78[1,2] |  | 23.9 | 22.1 | 20.9 |  |  | 17.9 | 16.9 | 16.1 | 14.8 | 14.3 | 13.8 |
|  | n78[3] |  | 1.1 | 0.8 | 0.3 |  |  | 0 | 0 | 0 | 0 | 0 | 0 |
| n8 | n78[4,5] |  | 10.8 | 9.1 | 8.0 |  |  | 5.1 | 4.2 | 3.5 | 2.3 | 2.1 | 1.4 |
| n8 | n78[1,2] |  | 10.8 | 9.1 | 8 |  |  | 3.5 | 2.3 | 1.4 | 1.1 | 1.0 | 0.9 |
| n8 | n79[1,2] |  |  |  |  |  |  | [6.8] | 6.2 | [5.6] | 4.9 |  | 4.4 |
| n28 | n75[1,2] | 28.1 | 25.3 | 24.0 | 22.8 |  |  |  |  |  |  |  |  |
|  | n78[1,2] |  | [10.4] | [8.9] | [7.8] |  |  | [4.7] | [3.7] | [3] | [1.7] | [1.2] | [0.7] |

NOTE 1: These requirements apply when there is at least one individual RE within the uplink transmission bandwidth of the aggressor (lower) band for which the 2nd transmitter harmonic is within the downlink transmission bandwidth of a victim (higher) band.

NOTE 2: The requirements should be verified for UL NR-ARFCN of the aggressor (lower) band (superscript LB) such that $f_{UL}^{LB} = \lfloor f_{DL}^{HB}/0.2 \rfloor 0.1$ in MHz and $F_{UL\_low}^{LB} + BW_{Channel}^{LB}/2 \le f_{UL}^{LB} \le F_{UL\_high}^{LB} - BW_{Channel}^{LB}/2$ with $f_{DL}^{HB}$ carrier frequency in the victim (higher) band in MHz and $BW_{Channel}^{LB}$ the channel bandwidth configured in the lower band.

NOTE 3: The requirements are only applicable to channel bandwidths with a carrier frequency at $\pm(20 + BW_{Channel}^{HB}/2)$ MHz offset from $2f_{UL}^{LB}$ in the victim (higher band) with $F_{UL\_low}^{LB} + BW_{Channel}^{LB}/2 \le f_{UL}^{LB} \le F_{UL\_high}^{LB} - BW_{Channel}^{LB}/2$, where $BW_{Channel}^{LB}$ and $BW_{Channel}^{HB}$ are the channel bandwidths configured in the aggressor (lower) and victim (higher) bands in MHz, respectively.

NOTE 4: These requirements apply when there is at least one individual RE within the uplink transmission bandwidth of a low band for which the 4th transmitter harmonic is within the downlink transmission bandwidth of a high band.

NOTE 5: The requirements should be verified for UL NR-ARFCN of a low band (superscript LB) such that $f_{UL}^{LB} = \lfloor f_{DL}^{HB}/0.4 \rfloor 0.1$ in MHz and $F_{UL\_low}^{LB} + BW_{Channel}^{LB}/2 \le f_{UL}^{LB} \le F_{UL\_high}^{LB} - BW_{Channel}^{LB}/2$ with $f_{DL}^{HB}$ the carrier frequency of a high band in MHz and $BW_{Channel}^{LB}$ the channel bandwidth configured in the low band.

DEGRADATION SIGNALING

RELATED APPLICATION

This application was originally filed as PCT Application No. PCT/FI2020/050143 on Mar. 6, 2020, which claims priority from U.S. Provisional Application No. 62/826,098, filed on Mar. 29, 2019, which is hereby incorporated in its entirety.

BACKGROUND

Technical Field

The example and non-limiting embodiments relate generally to radio signal communications and, more particularly, to messaging regarding signal degradation.

Brief Description of Prior Developments

When an uplink channel frequency and a downlink channel frequency are close to one another or have a harmonic relationship with one another, sensitivity may degrade if there is simultaneous transmission on the uplink and downlink frequencies.

BRIEF DESCRIPTION OF THE DRAWINGS

The foregoing aspects and other features are explained in the following description, taken in connection with the accompanying drawings, wherein:

FIG. 6A is a table illustrating part of an example of a maximum sensitivity degradation table as described herein;

FIG. 6B is a table illustrating part of an example of a maximum sensitivity degradation table as described herein;

FIG. 7 is a table illustrating an example of a maximum sensitivity degradation table as described herein;

DETAILED DESCRIPTION OF EMBODIMENTS

Figure 1:
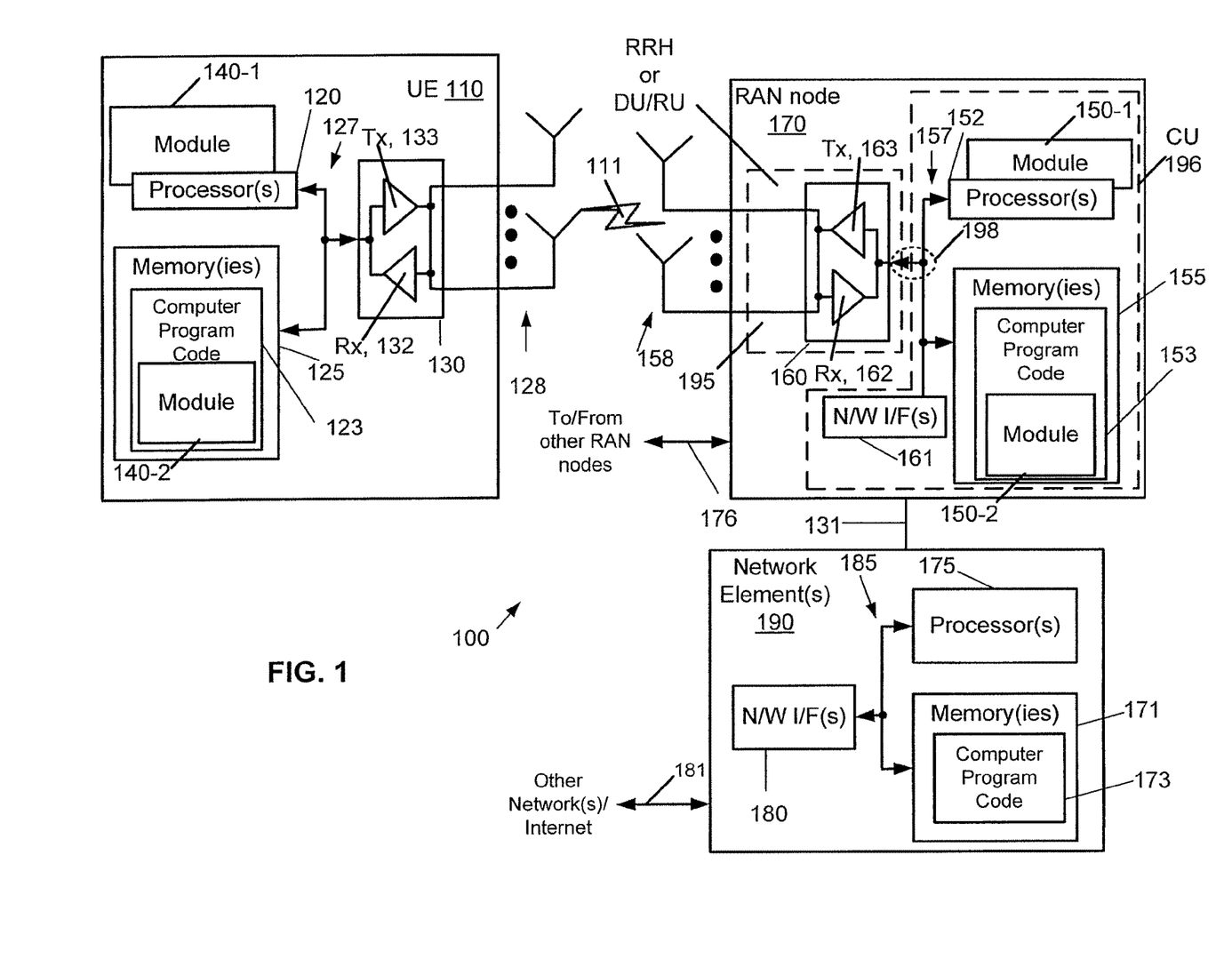
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
ARFCN absolute radio frequency channel number
BCS Bandwidth Combination Set
BW bandwidth
CIM3 Third Order Counter Inter-Modulation
CA Carrier Aggregation
CA/DC Carrier Aggregation/Dual Connectivity
CU central unit
DAC Digital Analogue Converter
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD Frequency Division Duplex
FR1 Frequency Range 1
gNB (or gNodeB) base station for 5G/NR, i.e., a node providing NR user plane and control plane protocol terminations towards the UE, and connected via the NG interface to the 5GC
HARQ Hybrid Automatic Repeat Request
I/F interface
IMD intermodulation
LB long block
LTE long term evolution
MAC medium access control
MME mobility management entity
MSD Maximum Sensitivity Degradation
ng or NG new generation
ng-eNB or NG-eNB new generation eNB
NR new radio
N/W or NW network
PDCP packet data convergence protocol
PHY physical layer
QSPK quadrature phase shift keying
RAN radio access network
RB Resource Block
RE resource element
Rel release
RLC radio link control
RRH remote radio head
RRC radio resource control
RSRQ reference signal quality
RU radio unit
Rx receiver
SDAP service data adaptation protocol
SGW serving gateway
SINR Signal-To-Interference-Plus-Noise Ratio
SMF session management function
SRB3 Signalling Radio Bearer 3
TDD Time Division Duplex
TS technical specification
Tx transmitter
UE user equipment (e.g., a wireless, typically mobile device)
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s). It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein may be used to define signaling. More specifically, features as described herein may be used to define signaling in regard to UE receiver performance degradation for example. In one example embodiment features as described herein may be used to define signaling such that a user equipment (UE) may indicate to a network an actual maximum sensitivity degradation (MSD) required for each supported E-UTRA-NR Dual Connectivity (EN-DC) or Long Term Evolution/New Radio Carrier Aggregation/Due Connectivity (LTE/NR CA/DC) configuration. This may be, for example, from those configurations allowed in maximum sensitivity degradation tables and/or configurations to include no maximum sensitivity degradation at all. This may be related to the signaling described in 3GPP Technical Specification (TS) 36.331 relating to Long Term Evolution (LTE) and/or 3GPP Technical Specification (TS) 38.331 relating to New Radio (NR) for example. FIG. 6 (shown as 6A-6B) and FIG. 7 show examples of maximum sensitivity degradation tables for LTE and NR, respectively, for example.

Referring now to FIGS. 6A and 6B, illustrated is a table showing examples of maximum sensitivity degradation for LTE, where FIG. 6B is a continuation of the table of FIG. 6A. FIGS. 6A and 6B may illustrate some examples in which MSD may be caused when uplink channel frequency and downlink channel frequency are close to each other. FIG. 6A includes that for EUTRA CA configuration CA_1A-3A, using EUTRA band 1, UL Fc of 1950 MHz, UL/DL BW of 5 MHz, UL $C_{LRB}$ of 25, and DL Fc of 2140 MHz, the maximum sensitivity degradation may have a value of 23 dB, where the duplex mode is FDD and the source of IMD is IMD3. FIG. 6A also includes that for EUTRA CA configuration CA_1A-8A, using EUTRA band 3, UL Fc of 1760 MHz, UL/DL BW of 5 MHz, UL $C_{LRB}$ of 25, and DL Fc of 1855 MHz, there may be no maximum sensitivity degradation, where the duplex mode is FDD and the source of IMD is not applicable. For example, a UE may, using the table of FIG. 6A, indicate to a network an actual maximum sensitivity degradation for CA_1A-3A of 23 dB, and indicate to the network that there is no maximum sensitivity degradation for CA_1A-8A.

Referring now to FIG. 7, illustrated is a table showing examples of MSD for NR. FIG. 7 may illustrate some examples in which MSD may be caused when uplink channel frequency and downlink channel frequency have a harmonic relationship with one another. FIG. 7 includes that where UL band is n3 and DL band is n77, there may be no MSD due to harmonic exception for the DL band at 5 MHz. FIG. 7 also includes that where UL band is n3 and DL band is n77, there may be MSD of 23.9 dB. For example, a UE may, using the table of FIG. 7, indicate to a network that there is no maximum sensitivity degradation for UL band n3 and DL band n77 at 5 MHz, and may indicate to the network an actual maximum sensitivity degradation of 23.9 dB at UL band n3 and DL band n77 at 10 MHz.

Features as described herein may be used to define improved maximum sensitivity degradation values for some E-UTRA-NR Dual Connectivity (EN-DC), Long term Evolution Carrier Aggregation/Dual Connectivity (LTE/NR CA/DC). For example, this may be used in relation to 3GPP TS 36.101 in regard to LTE, and/or New Radio Carrier Aggregation/Dual Connectivity (NR CA/DC) configurations, such as in relation to 3GPP TS 38.101-1, 38.101-2 and 38.101-3 for NR, and signaling such as in the 3GPP TS 36.331 relating to LTE and/or 3GPP TS 38.331 relating to NR for example. With features as described herein, each UE may indicate to a network that the UE can support the improved maximum sensitivity degradation (MSD) values for such configurations.

Figure 2:
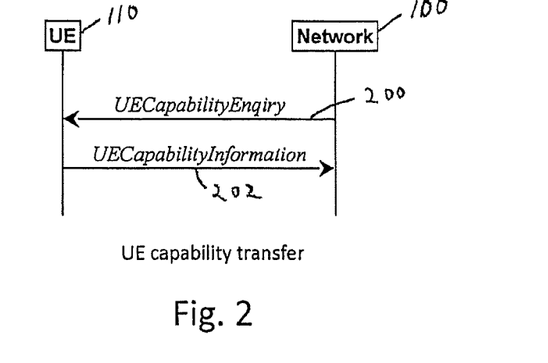
FIG. 2 is a diagram illustrating features as described herein.

Referring also to FIG. 2, one example is shown in regard to signaling between the user equipment (UE) 110 and one or more components of the network 100. In this example implementation, as shown by 200 the network 100 may transmit a signal or message, such as UECapabilityEnquiry, to the UE 110 to inquire about the capability of the UE. In response to the inquiry 200, the UE 110 is configured to indicate to the network 100, such as via signaling or message 202, an actual or improved MSD required for each EN-DC configuration. Thus, the UE may communicate to the network via the UE capability transfer signaling, such as UECapabilityInformation as 202 for example, the actual or improved MSD required for each EN-DC configuration. The actual or improved MSD required for each EN-DC configuration may be selected from those allowed in the MSD tables, or the UE may indicate no MSD at all for example.

Figure 3:
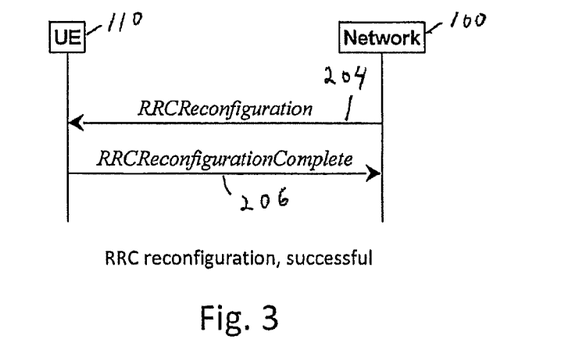
FIG. 3 is a diagram illustrating features as described herein.
Figure 4:
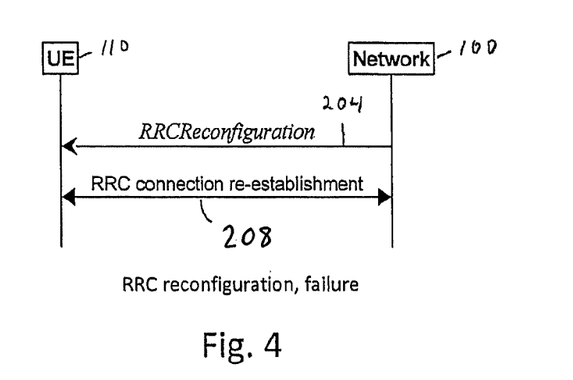
FIG. 4 is a diagram illustrating features as described herein.

Referring also to FIGS. 4, one example is shown in regard to signaling between the user equipment (UE) 110 and one or more components of the network 100. In this example implementation, as shown by 204 the network 100 may transit a signal or message, such as RRCReconfiguration for example, to the UE 110 for establishing a Radio Connection between UE and Network. FIG. 3 shows where a RRC reconnection is successful and FIG. 4 shows where a RRC reconnection has a failure. The UE 110 may be configured to indicate to the network 100 the actual MSD required for each EN-DC configuration in both of these situations. In response to the signaling 204 from the network 100, as indicated by 206 or 208 the UE 110 may transmit a signal or message to the network 100. The signal or message 206 or 208 may signal the actual MSD required for each EN-DC configuration. The signal or message 206 may be, for example, via the Signaling Radio Bearer SRB3 for RRC (re-) configuration, in the case where a RRC reconnection has a failure. Alternatively, in the case where a RRC reconnection has a failure, the signal or message from the UE may be a RRC connection re-establishment message 208. The actual MSD required for each EN-DC configuration may be from those allowed in the MSD tables or no MSD at all, for example.

Figure 5:
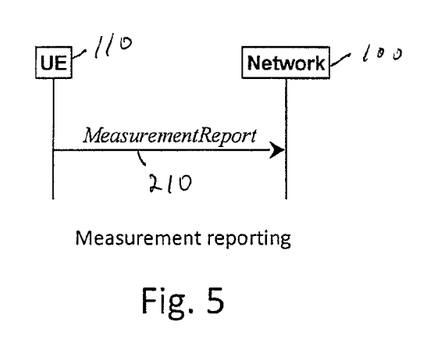
FIG. 5 is a diagram illustrating features as described herein.

Referring also to FIG. 5, one example is shown in regard to signaling between the user equipment (UE) 110 and one or more components of the network 100. In this example implementation, the UE 110 may be configured to indicate to the network 100 via measurement reporting 210, such as MeasurementReport, that the actual MSD occurred with cross band transmit-to-receiver degradation. This may be done, for example, by measuring the resulting SINR in the downlink receive signal when simultaneous transmission on the uplink is present. In example embodiments, the measurement reporting may be explicitly requested by the network 100, or the measurement reporting may be autonomously reported by the UE 110 as part of normal measurement reporting for example.

In one implementation a new Bandwidth Combination Set (BCS) could be defined in the 3GPP standard for the improved MSD performances, then the UE can signal which BCS (old, or new, or both) the UE can support (for example via UE capacity signaling), and the improved MSD may be linked to that particular new BCS support. The UE 110 may inform the network 100 which BCS(s) the UE supports and, in the case where the UE indicated the new BCS with improved MSD, the network can take this improved performance into consideration. Also, in the case where the UE indicates support for improved MSD BCS and other BCS(s) that do not have improved MSD, the network 100 knows that UE 110 has a better filter implemented and the MSD is expected to be better or non-existent for all BCS. This method does not need modification to existing signaling because the BCS signaling is used for both LTE and NR carrier aggregation.

As noted above, features as described herein may be used to define some signaling in the LTE and/or NR such that each UE can indicate to the network the actual MSD required for each supported EN-DC/CA/DC configuration. In regard to maximum sensitivity degradation (MSD), as discussed in 3GPP R4-1901880, a number of FDD-TDD EN-DC configurations have been defined in the Rel-15 3GPP TS 38.101-3 NR specification. For EN-DC configurations, where the uplink channel frequency (especially NR) is close to, or has a harmonic relationship with, the downlink channel frequency (especially LTE), or two or more uplink channel frequencies transmitted simultaneously generate intermodulation (IMD) product with relation to at least one downlink channel frequency being received by the UE, the downlink reference sensitivity is expected to be degraded if simultaneous transmission on the uplink of the aggressor is present. For example, a NR uplink channel frequency in the TDD band may be close to an LTE downlink channel frequency for an EN-DC configuration in an FDD band. Typical UE implementations may use filters which do not have steep or much out-of-band attenuation in the TDD band since there is no self-band protection required which enables lower front-end insertion loss which is beneficial for coverage. This has the consequence that the spurious and out-of-band emissions rejection to nearby bands is also then lower. In addition, NR has much wider bandwidths than LTE in many FR1 bands supporting up to 100 MHz channel bandwidth. This results in higher spurious and out-of-band emissions due to transmit spectral re-growth noise at larger frequency offsets away from the transmission channel. Additionally, the cross-modulation effect, when simultaneous wideband transmission on NR is present with narrowband transmission on LTE, reaches further in the frequency domain due to the wider bandwidths of NR. Therefore, third order cross-modulation products are more likely to impact downlink receive bands, especially for those FDD bands with relatively narrow duplex distance. Furthermore, baseband spurious products, such as CIM3 or transmit DAC sampling images for example, extend further due to wider NR channel bandwidths available for transmission and, thus, are more likely to impact downlink receive bands when they might not have previously reached for LTE carrier aggregation. Receiver blocking is also a factor in such EN-DC configuration that can degrade sensitivity. The potential receiver blocking degradation in FDD band downlink is dependent on the FDD band receive filter rejection in the TDD band transmit frequency range.

3GPP TS 36.101 specification for LTE and 3GPP TS 38.101 specification for NR have made accommodations for cross band transmit-to-receiver degradation in several different ways. A MSD table has been created; Table 7.3B.2.3.3-1: Reference sensitivity exceptions due to close proximity of bands for EN-DC in NR FR1 in NR 38.101-3. A separate table for MSD due to insufficient cross-band isolation has been created; Table 7.3B.2.3.4-1: Reference sensitivity exceptions due to cross band isolation for EN-DC in NR FR1 in NR 38.101-3. In 3GPP TS 36.101 for LTE, several FDD-TDD CA combinations of this nature were defined, comprising restricting uplink to only the FDD band or allowing uplink in the TDD band as a distinct BCS option in one case, but this option cannot be applied to EN-DC where both uplinks are required. Moreover, for TDD-TDD bands, a signaling capability has been created to allow the UE to indicate that it cannot support simultaneous transmit-receive. When signaled as such, the UE is only capable of meeting performance when the transmit is orthogonal to the receive in the time domain and, thus, no interference to receiver occurs. However, this solution may not be feasible for FDD-TDD EN-DC since it would require tight scheduling of FDD grants to align with TDD grants yet at the same time adhering to the HARQ timelines. Therefore, MSD may be a more preferred solution to FDD-TDD EN-DC. Features as described herein provide a solution for use of the MSD.

The same problems exist also for LTE carrier aggregation/dual connectivity and NR carrier aggregation/dual connectivity. In the case of LTE or NR the carrier aggregation operation is such that only one uplink is used; then, there is no cross-modulation effect as described above, but other mentioned issues may be present. In the case of the LTE or NR carrier aggregation operation is such that two uplinks are used, then the situation is very similar to EN-DC.

As discussed in 3GPP R4-1902146, the MSD for each EN-DC configuration may be a function of the separation between transmit and receive frequencies as well as the uplink and downlink bandwidths. The MSD for each UE may be different depending on implementation. For example, previously there was not sufficient isolation between TDD Band 41 and mid-spectrum FDD bands such as Band 25, Band 3 and Band 1 with earlier filters. However, more recent advances in technology have enabled integrated filter/multiplexer products to achieve sufficient isolation between TDD Band 41 and FDD Band 1 to allow for dual transmission in TDD Band 41 and FDD Band 1 uplink carrier aggregation with no MSD allowed.

The MSD allowed in the 3GPP TS 36.101 for the LTE specification and 3GPP TS 38.101 for the NR specification have been based on certain implementation assumptions such as achievable filter rejection that should be updated with advances in technology. However, the MSD tables defined in the 3GPP TS 36.101 for the LTE specification and 3GPP TS 38.101 for the NR specification cannot be updated with advances in technology due to backward compatibility issue. Therefore, the network scheduler can only base the scheduling decisions on the MSD tables defined in the 3GPP TS 36.101 for the LTE specification and 3GPP TS 38.101 for the NR specification which have been based on outdated technology with the allowed MSD much larger than the ones required by each UE for each EN-DC configuration. This could have a big negative impact on the network performance both in the uplink due to uplink resource block (RB) restriction and the downlink due to pessimistic downlink scheduling. Features as described herein may help to avoid or reduce these issues. As noted above, two uplinks transmitted simultaneously may generate intermodulation (IMD) product to downlink band(s) being received by the UE. MSD tables exist for that, and a similar signaling as described herein could be used to address intermodulation due to simultaneous transmission of two uplinks.

Figure 8:
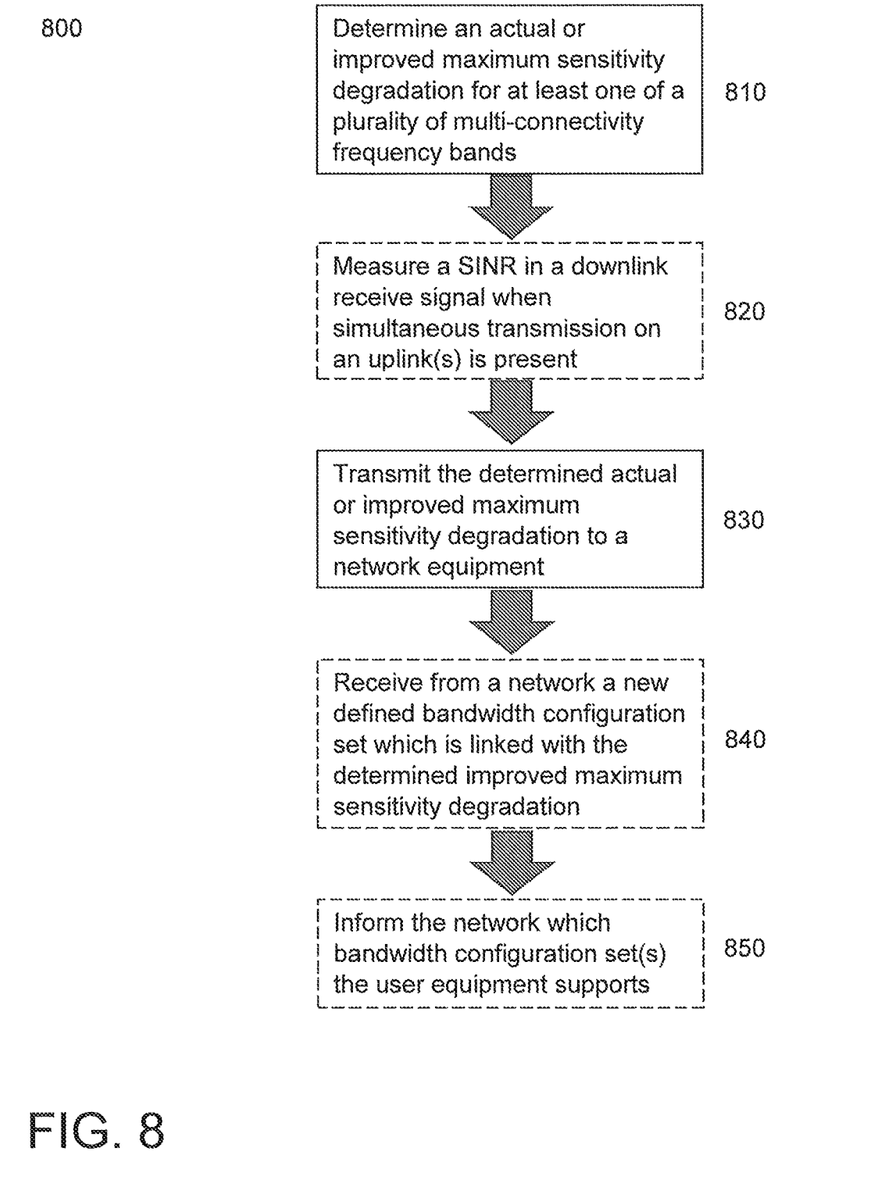
FIG. 8 is a flowchart illustrating steps as described herein.

FIG. 8 illustrates the potential steps of an example embodiment. In accordance with one aspect, an example method 800 is provided comprising: determining by a user equipment an actual or improved maximum sensitivity degradation for at least one of a plurality of multi-connectivity frequency bands 810; and transmitting the determined actual or improved maximum sensitivity degradation from the user equipment to a network equipment 830. Optionally, the example method may further comprise measuring a Signal-To-Interference-Plus-Noise Ratio in a downlink receive signal when simultaneous transmission on an uplink(s) is present 820. Optionally, the example method may further comprise receiving by the user equipment from a network a new defined bandwidth combination set which is linked with the determined improved maximum sensitivity degradation 840. Optionally, the example method may further comprise the user equipment informing the network which bandwidth combination set(s) the user equipment supports 850.

It should be noted that the order of the steps of the example method may vary, and that the example method may comprise fewer or additional steps.

The transmitting of the determined actual or improved maximum sensitivity degradation from the user equipment may be by a capability transfer signaling the actual or improved maximum sensitivity degradation required for the at least one of the plurality of multi-connectivity frequency bands. The plurality of multi-connectivity frequency bands may be each of a plurality of E-UTRA-NR Dual Connectivity or Long Term Evolution/New Radio Carrier Aggregation/Dual Connectivity (LTE/NR CA/DC) configurations. The transmitting of the determined actual or improved maximum sensitivity degradation from the user equipment may indicate one allowed in a maximum sensitivity degradation table. The transmitting of the determined actual or improved maximum sensitivity degradation from the user equipment may indicate no actual or improved maximum sensitivity degradation. The transmitting of the determined actual or improved maximum sensitivity degradation may be in a signaling radio bearer for radio resource control configuration or reconfiguration. The signaling radio bearer may be SRB3. The transmitting of the determined actual or improved maximum sensitivity degradation from the user equipment may comprise measurement reporting of the determined actual or improved maximum sensitivity degradation from the user equipment with cross band transmit-to-receive degradation. The method may further comprise measuring a Signal-To-Interference-Plus-Noise Ratio in a downlink receive signal when simultaneous transmission on an uplink(s) is present. The transmitting of the determined actual or improved maximum sensitivity degradation from the user equipment may be in response to an explicit request from a network. The transmitting of the determined actual or improved maximum sensitivity degradation from the user equipment may be autonomously reported by the user equipment without an explicit request from a network. The method may further comprise receiving by the user equipment from a network a new defined bandwidth combination set which is linked with the determined improved maximum sensitivity degradation. This may be used with a new BCS table defined in 3GPP standards to be linked with the improved capability (e.g. 3 dB to 1 dB MSD in new BCS), but not actual MSD performances (e.g. UE can actually meet 0.5 dB MSD) 'with the determined improved'. The method may further comprise the user equipment informing the network which bandwidth combination set(s) the user equipment supports.

In accordance with another aspect, an example embodiment may be provided in an apparatus comprising: at least one processor; at least one non-transitory memory including computer program code, the at least one non-transitory memory and the computer program code configured to, with the at least one processor, cause the apparatus to: determine by a user equipment an actual or improved maximum sensitivity degradation for at least one of a plurality of multi-connectivity frequency bands; and cause transmitting of the determined actual or improved maximum sensitivity degradation from the user equipment to a network equipment.

The apparatus may be further configured to cause the transmitting of the determined actual or improved maximum sensitivity degradation from the user equipment with a capability transfer signaling of the respective actual or improved maximum sensitivity degradation required for the at least one of the plurality of multi-connectivity frequency bands. The plurality of multi-connectivity frequency bands may respectively comprise a plurality of E-UTRA-NR Dual Connectivity configurations, or Carrier Aggregation or Dual Connectivity in Long Term Evolution or New Radio configurations. The apparatus may be further configured to cause the transmitting of the determined actual or improved maximum sensitivity degradation from the user equipment indicated as the at least one of the plurality of multi-connectivity frequency bands allowed in a maximum sensitivity degradation table. The apparatus may be further configured to cause the transmitting of the determined actual or improved maximum sensitivity degradation from the user equipment indicated as the at least one of the plurality of multi-connectivity frequency bands associated with no actual or improved maximum sensitivity degradation. The apparatus may be further configured to cause the transmitting of the determined actual or improved maximum sensitivity degradation in a signaling radio bearer for radio resource control configuration or reconfiguration. The signaling radio bearer may be SRB3. The transmitting of the determined actual or improved maximum sensitivity degradation from the user equipment may comprise measurement reporting of the determined actual or improved maximum sensitivity degradation from the user equipment with cross band transmit-to-receive degradation. The apparatus may be further configured to cause measuring of a Signal-To-Interference-Plus-Noise Ratio in a downlink receive signal when simultaneous transmission on one or more uplinks is present. The apparatus may be further configured to cause the transmitting of the determined actual or improved maximum sensitivity degradation from the user equipment in response to an explicit request from a network. The apparatus may be further configured to cause the transmitting of the determined actual or improved maximum sensitivity degradation from the user equipment autonomously without an explicit request from a network. The apparatus may be further configured to cause receiving with the user equipment from a network at least one new defined bandwidth combination set which is linked with the determined improved maximum sensitivity degradation. The apparatus may be further configured to cause the user equipment to inform the network which bandwidth combination set(s) the user equipment supports.

In accordance with another aspect, an example embodiment may be provided in a non-transitory program storage device, such as shown in FIG. 1, readable by a machine, tangibly embodying a program of instructions executable by the machine for performing operations, the operations comprising: determining by a user equipment an actual or improved maximum sensitivity degradation for at least one of a plurality of multi-connectivity frequency bands; and transmitting the determined actual or improved maximum sensitivity degradation from the user equipment to a network equipment.

The transmitting of the determined actual or improved maximum sensitivity degradation from the user equipment may comprise measurement reporting of the determined actual or improved maximum sensitivity degradation from the user equipment with cross band transmit-to-receive degradation. The operations may further comprise measuring a Signal-To-Interference-Plus-Noise Ratio in a downlink receive signal when simultaneous transmission on one or more uplinks is present. The operations may further comprise receiving with the user equipment from a network at least one new defined bandwidth combination set which is linked with the determined improved maximum sensitivity degradation.

In accordance with another aspect, an example embodiment may be provided in an apparatus comprising: means for determining by a user equipment an actual or improved maximum sensitivity degradation for at least one of a plurality of multi-connectivity frequency bands; and means for transmitting the determined actual or improved maximum sensitivity degradation from the user equipment to a network equipment.

The transmitting of the determined actual or improved maximum sensitivity degradation from the user equipment may comprise measurement reporting of the determined actual or improved maximum sensitivity degradation from the user equipment with cross band transmit-to-receive degradation. The apparatus may further comprise means for measuring a Signal-To-Interference-Plus-Noise Ratio in a downlink receive signal when simultaneous transmission on one or more uplinks is present. The apparatus may further comprise means for receiving with the user equipment from a network at least one new defined bandwidth combination set which is linked with the determined improved maximum sensitivity degradation.

Figure 9:
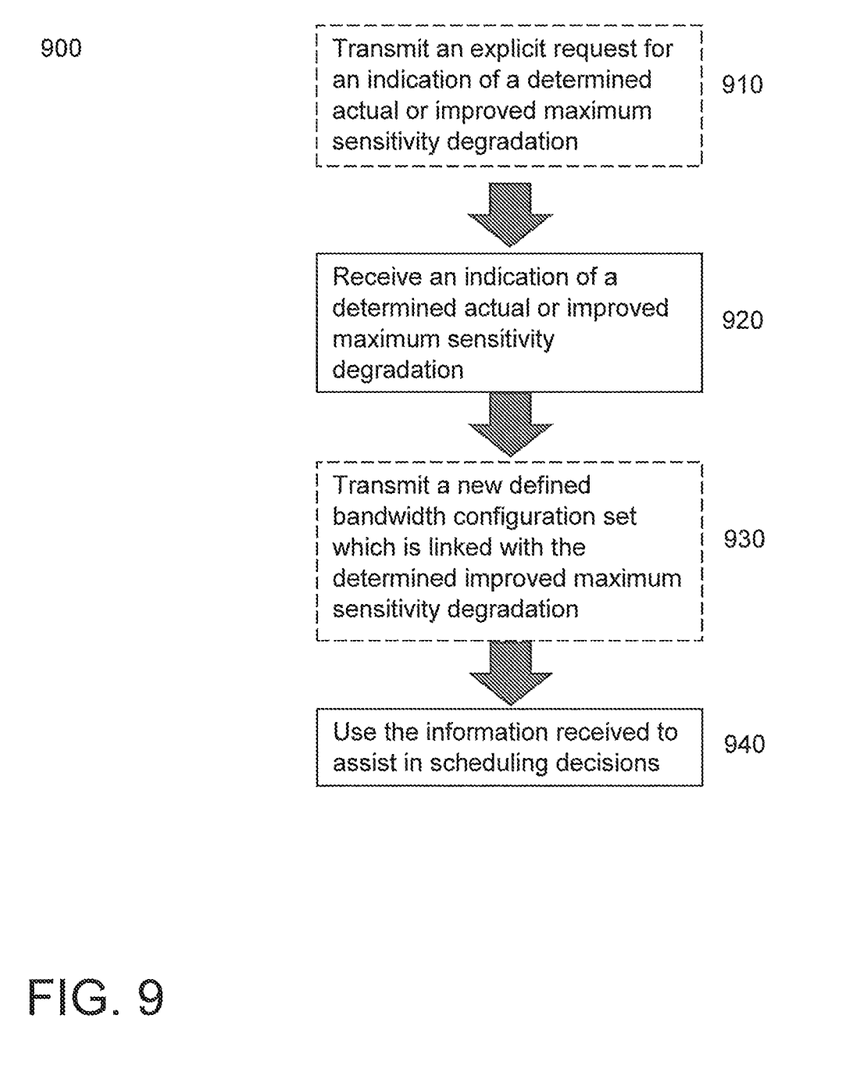
FIG. 9 is a flowchart illustrating steps as described herein.

FIG. 9 illustrates the potential steps of an example embodiment. In accordance with another aspect, an example method 900 may be provided comprising: receiving by a network equipment an indication of a determined actual or improved maximum sensitivity degradation from a user equipment 920; and using the information received from the user equipment to assist in scheduling decisions by the network equipment 940. Optionally, the example method may further comprise transmitting an explicit request for the indication of the determined actual or improved maximum sensitivity degradation 910, where the receiving for the indication is in response to the explicit request. Optionally, the example method may further comprise transmitting to the user equipment with the network equipment a new defined bandwidth combination set which is linked with the determined improved maximum sensitivity degradation 930.

It should be noted that the order of the steps of the example method may vary, and that the example method may comprise fewer or additional steps.

The receiving of the indication of the determined actual or improved maximum sensitivity degradation from the user equipment may comprise receiving measurement reporting of the determined actual or improved maximum sensitivity degradation from the user equipment with cross band transmit-to-receive degradation. The method may further comprise transmitting an explicit request for the indication of the determined actual or improved maximum sensitivity degradation to the user equipment, where the receiving of the indication may be in response to the explicit request. The method may further comprise transmitting to the user equipment with the network equipment a new defined bandwidth combination set which may be linked with the determined improved maximum sensitivity degradation.

In accordance with another aspect, an example embodiment may be provided in an apparatus comprising: at least one processor; at least one non-transitory memory including computer program code, the at least one non-transitory memory and the computer program code configured to, with the at least one processor, cause the apparatus to: cause receiving by a network equipment of an indication of a determined actual or improved maximum sensitivity degradation from a user equipment; and using the information received from the user equipment to assist in scheduling decisions by the network equipment.

The causing of the receiving of the indication of the determined actual or improved maximum sensitivity degradation from the user equipment may comprise causing receiving of measurement reporting of the determined actual or improved maximum sensitivity degradation from the user equipment with cross band transmit-to-receive degradation.

The apparatus may be further configured to cause transmitting of an explicit request for the indication of the determined actual or improved maximum sensitivity degradation to the user equipment, where the receiving of the indication may be in response to the explicit request. The apparatus may be further configured to cause transmitting to the user equipment with the network equipment a new defined bandwidth combination set which may be linked with the determined improved maximum sensitivity degradation.

In accordance with another aspect, an example embodiment may be provided in a non-transitory program storage device, such as shown in FIG. 1 for example, readable by a machine, tangibly embodying a program of instructions executable by the machine for performing operations, the operations comprising: cause receiving by a network equipment an indication of a determined actual or improved maximum sensitivity degradation from a user equipment; and using the information received from the user equipment to assist in scheduling decisions by the network equipment.

The causing of the receiving of the indication of the determined actual or improved maximum sensitivity degradation from the user equipment may comprise causing receiving of measurement reporting of the determined actual or improved maximum sensitivity degradation from the user equipment with cross band transmit-to-receive degradation. The operations may further comprise cause transmitting of an explicit request for the indication of the determined actual or improved maximum sensitivity degradation to the user equipment, where the receiving of the indication is in response to the explicit request. The operations may further comprise cause transmitting to the user equipment with the network equipment a new defined bandwidth combination set which is linked with the determined improved maximum sensitivity degradation.

In accordance with another aspect, an example embodiment may be provided in an apparatus comprising: means for receiving by a network equipment an indication of a determined actual or improved maximum sensitivity degradation from a user equipment; and means for using the information received from the user equipment to assist in scheduling decisions by the network equipment.

The receiving of the indication of the determined actual or improved maximum sensitivity degradation from the user equipment may comprise receiving measurement reporting of the determined actual or improved maximum sensitivity degradation from the user equipment with cross band transmit-to-receive degradation. The apparatus may further comprise means for transmitting an explicit request for the indication of the determined actual or improved maximum sensitivity degradation to the user equipment, where the receiving of the indication may be in response to the explicit request. The apparatus may further comprise means for transmitting to the user equipment with the network equipment a new defined bandwidth combination set which may be linked with the determined improved maximum sensitivity degradation.

A network scheduler can use the information to assist in scheduling decisions. For example, the information may be used by the network to reduce the uplink or downlink resource blocks allocation for the UE that previously required large MSD, or avoid uplink resource blocks that now require large MSD. The UE may or may not already be measuring the SINR for data signal according to implementation. This is different from the conventional 3GPP standards which require the UE to measure reference signal quality (RSRQ), because the conventional 3GPP standards do not require measurement of data signal quality.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. An apparatus comprising:
   at least one processor;
   at least one non-transitory memory including computer program code, the at least one non-transitory memory and the computer program code configured to, with the at least one processor, cause the apparatus to:
   determine an actual or improved maximum sensitivity degradation for at least one of a plurality of combinations of multi-connectivity frequency bands, wherein the determined actual or improved maximum sensitivity degradation is linked with at least one existing or new defined bandwidth combination set, wherein the determining of the actual or improved maximum sensitivity degradation comprises measuring a signal to interference plus noise ratio in a downlink receive signal when simultaneous transmission on one or more uplinks is present; and
   transmit an indication associated with the determined actual or improved maximum sensitivity degradation to a network equipment.

2. The apparatus of claim 1, where the at least one non-transitory memory and the computer program code are configured to, with the at least one processor, cause the apparatus to:
   transmit the indication associated with the determined actual or improved maximum sensitivity degradation with a capability transfer signaling of the respective actual or improved maximum sensitivity degradation required for the at least one of the plurality of multi-connectivity frequency bands.

3. The apparatus of claim 1, where the plurality of multi-connectivity frequency bands respectively comprise a plurality of dual connectivity configurations, or carrier aggregation or dual connectivity in long term evolution or new radio configurations.

4. The apparatus of claim 1, where the at least one non-transitory memory and the computer program code are configured to, with the at least one processor, cause the apparatus to:
   transmit the indication associated with the determined actual or improved maximum sensitivity degradation indicated as the at least one of the plurality of multi-connectivity frequency bands allowed in a maximum sensitivity degradation table.

5. The apparatus of claim 1, where the at least one non-transitory memory and the computer program code are configured to, with the at least one processor, cause the apparatus to:
   transmit the indication associated with the determined actual or improved maximum sensitivity degradation indicated as the at least one of the plurality of multi-connectivity frequency bands associated with no actual or improved maximum sensitivity degradation.

6. The apparatus of claim 1, where the at least one non-transitory memory and the computer program code are configured to, with the at least one processor, cause the apparatus to:
   transmit the indication associated with the determined actual or improved maximum sensitivity degradation in a signaling radio bearer for radio resource control configuration or reconfiguration.

7. The apparatus of claim 6, where the signaling radio bearer is a signaling radio bearer 3.

8. The apparatus of claim 1, where the transmitting the indication associated with the determined actual or improved maximum sensitivity degradation comprises measurement reporting of the determined actual or improved maximum sensitivity degradation with cross band transmit-to-receive degradation.

9. The apparatus of claim 1, where the at least one non-transitory memory and the computer program code are configured to, with the at least one processor, cause the apparatus to:
   transmit the indication associated with the determined actual or improved maximum sensitivity degradation in response to an explicit request from a network.

10. The apparatus of claim 1, where the at least one non-transitory memory and the computer program code are configured to, with the at least one processor, cause the apparatus to:
   transmit the indication associated with the determined actual or improved maximum sensitivity degradation autonomously without an explicit request from a network.

11. The apparatus of claim 1, wherein transmitting the determined actual or improved maximum sensitivity degradation comprises the at least one non-transitory memory and the computer program code are configured to, with the at least one processor, cause the apparatus to:
   transmit the at least one existing or new defined bandwidth combination set which is linked with the determined actual or improved maximum sensitivity degradation.

12. The apparatus of claim 11, where the at least one non-transitory memory and the computer program code are configured to, with the at least one processor, cause the apparatus to:
   inform to the network equipment which bandwidth combination set(s) are supported.

13. A non-transitory program storage device readable with a machine, tangibly embodying a program of instructions executable by the machine for performing operations, the operations comprising:
   determining an actual or improved maximum sensitivity degradation for at least one of a plurality of multi-connectivity frequency bands, wherein the determined actual or improved maximum sensitivity degradation is linked with at least one existing or new defined bandwidth combination set, wherein the determining of the actual or improved maximum sensitivity degradation comprises measuring a signal to interference plus noise ratio in a downlink receive signal when simultaneous transmission on one or more uplinks is present; and
   transmitting the determined actual or improved maximum sensitivity degradation to a network equipment.

14. The non-transitory program storage device of claim 13, where the transmitting of the determined actual or improved maximum sensitivity degradation comprises measurement reporting of the determined actual or improved maximum sensitivity degradation with cross band transmit-to-receive degradation.

15. An apparatus comprising:
   at least one processor;
   at least one non-transitory memory including computer program code, the at least one non-transitory memory and the computer program code configured to, with the at least one processor, cause the apparatus to:
      receive an indication of a determined actual or improved maximum sensitivity degradation from a user equipment, wherein the determined actual or improved maximum sensitivity degradation is linked with at least one existing or new defined bandwidth combination set, wherein the determining of the actual or improved maximum sensitivity degradation comprises measuring a signal to interference plus noise ratio in a downlink receive signal when simultaneous transmission on one or more uplinks is present; and
      use information received from the user equipment to assist in scheduling decisions.

16. The apparatus of claim 15, wherein the receiving of the indication of the determined actual or improved maximum sensitivity degradation from the user equipment comprises the at least one non-transitory memory and the computer program code are configured to, with the at least one processor, cause the apparatus to:
   receive measurement reporting of the determined actual or improved maximum sensitivity degradation from the user equipment with cross band transmit-to-receive degradation.

17. The apparatus of claim 15, where the at least one non-transitory memory including computer program code, the at least one non-transitory memory and the computer program code configured to, with the at least one processor, cause the apparatus to:
   transmit an explicit request for the indication of the determined actual or improved maximum sensitivity degradation to the user equipment, where the indication is received in response to the explicit request.

18. The apparatus of claim 15, where the at least one non-transitory memory including computer program code, the at least one non-transitory memory and the computer program code configured to, with the at least one processor, cause the apparatus to:
   transmit to the user equipment the at least one existing or new defined bandwidth combination set which is linked with the determined actual or improved maximum sensitivity degradation.

* * * * *